UNITED STATES PATENT OFFICE.

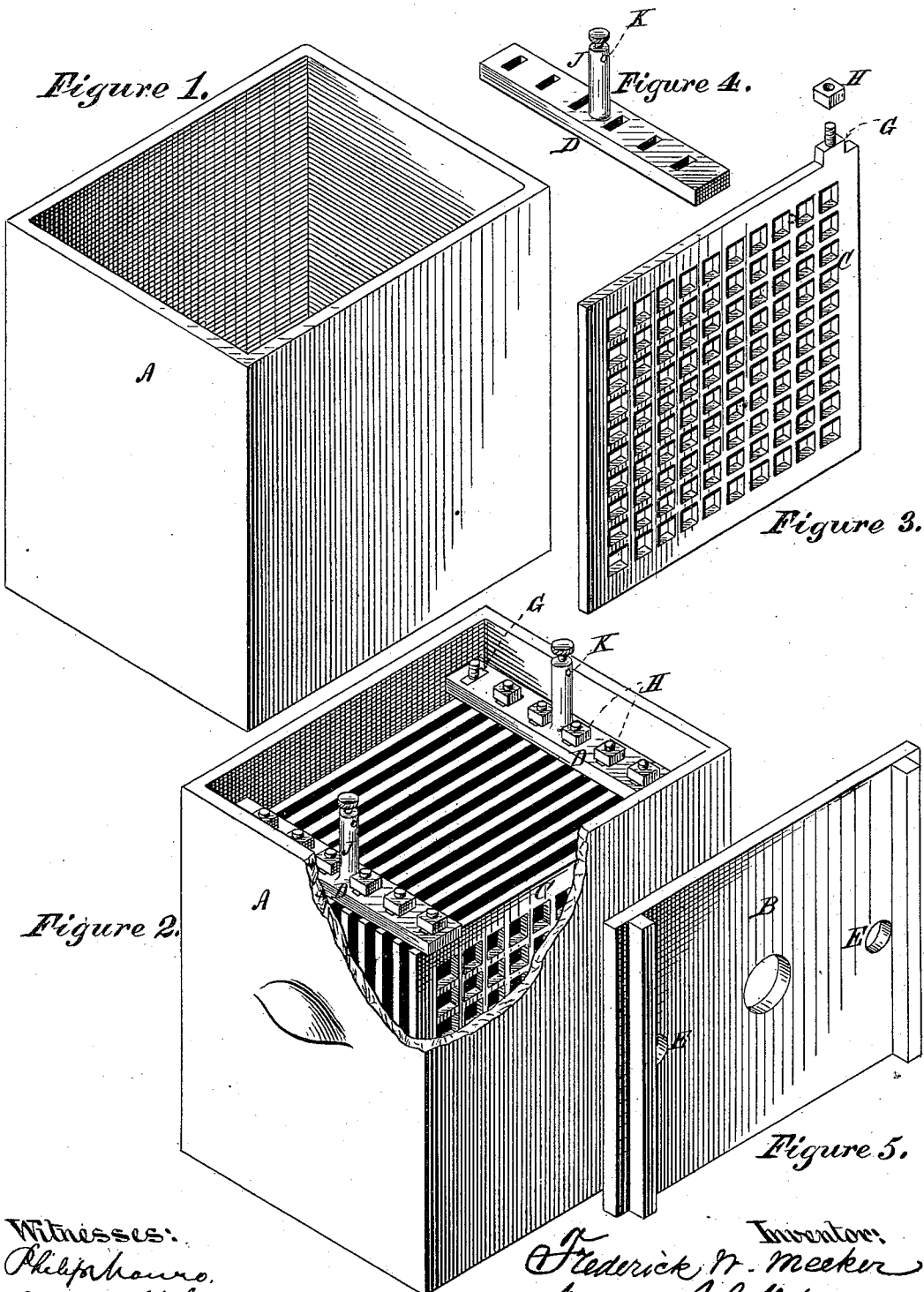

FREDERICK W. MEEKER, OF NEW YORK, N. Y.

MANUFACTURE OF EARTHENWARE TANKS OR CELLS FOR GALVANIC BATTERIES.

SPECIFICATION forming part of Letters Patent No. 334,027, dated January 12, 1886.

Application filed May 14, 1884. Serial No. 131,526. (No model.)

*To all whom it may concern:*

Be it known that I, FREDERICK W. MEEKER, of the city, county, and State of New York, have invented a new and useful Improvement in the Manufacture of Earthenware Tanks or Cells for Galvanic Batteries, which is fully set forth in the following specification.

This invention relates more particularly to cells or tanks for containing the elements of that class of galvanic batteries which give no electricity of themselves, but which, being included for a time in a circuit with a source of electricity—dynamo-electric machine or primary galvanic battery, for example—become charged, so that they subsequently give out electricity on completion of a proper circuit, and can thus be used like a reservoir of electricity.

The secondary batteries of Gaston Planté and Camille A. Faure are well known.

It has been found impossible to procure cells or boxes made of glass of sufficient size to receive electrodes as large as are required to take a sufficient charge of electricity, and those boxes which have been made of wood, though large enough to receive the plates or electrodes of the required size, have been found impractical and defective from their liability to leakage from expansion, contraction, and working of the joints caused by the different temperatures and the handling they are necessarily subjected to.

In the cell or box to contain the electrodes and electrolytic liquid great strength is an essential. Thus a cell or box of sufficient size to have an inside measurement of one or two cubic feet should be strong enough to carry safely from seventy-five to two hundred and fifty pounds of lead or other metal, and admit of some considerable handling and transportation. It should also be light and compact, so as not to increase the expense of transportation and difficulty of handling. It must be water-tight, and not affected by contraction and expansion caused by different temperatures. It must also be able to resist the action of a ten per cent. solution of sulphuric acid when electrified, as it weakens the force of the battery when there is an absorption or a leakage of the electrolytic liquid. All the cells or boxes at present in use for this purpose are defective in some or all of the respects mentioned.

The following is a correct description of my improved cell or box. In the present invention this cell, tank, or box which contains the electrodes and electrolytic liquid is composed of fire-clay, and I have found that a fire-clay which gives the following analysis can be used to advantage for this purpose:

| | |
|---|---|
| Alumina .................... 21.83 ⎫ | |
| Silicic acid ................. 19.44 ⎬ Combined. | |
| Water (moisture) .......... 5.90 ⎭ | |
| | 46.17 |
| Silica (quartz sand) .............................. | 48.40 |
| Potash ......................... 2.24 | |
| Lime .............................. .28 | |
| Magnesia ....................... .24 | |
| Sesquioxide of iron ....... 1.57 | |
| Water (moisture) .......... .80 | |
| | 5.13 |
| Total .................................. | 99.70 |

Other fire-clays may be used the analyses of which vary more or less from that above given, but which have similar qualities.

The clay is worked and reduced to a plastic and homogeneous body in the same manner as clays are prepared for pottery in general, either by hand or machinery. After the clay is sufficiently pugged to be pliable and homogeneous, it is worked into a mold having the desired inside measurement. A convenient shape is in the proportion of twelve inches in length, nine inches in width, and thirteen inches in depth, and preferably having rectangular corners. The thickness of a cell of this size need not ordinarily be more than three-quarters of an inch, and as much less as the quality of the clay will admit, making due allowance for the shrinkage of the same. The molded clay is next taken from the mold after drying sufficiently to retain its shape and allowed to dry again until it may be handled with safety and to obtain the proper amount of absorption for the next treatment. It is then dipped in a solution called a "slip-glaze," which glaze is a solution of clay suitable for glazing. I have found that a solution of clay which gives the following analysis can be used to advantage for this purpose:

| | |
|---|---|
| Water (moisture)...................... | 0.43 |
| Silica....................................... | 57.55 |
| Alumina.................................. | 12.92 |
| Oxide of iron.......................... | 7.50 |
| Lime....................................... | 6.58 |
| Magnesia................................. | 3.39 |
| Soda....................................... | 7.94 |
| Potash.................................... | 3.69 |
| Total ............................. | 100.00 |

Other solutions of clay may be used which have similar qualities. This solution should be reduced to the proper consistency with water. The slip-glaze is to form the protection from leakage and to resist the chemical action of the sulphuric acid when electrified upon the body of the tank or cell. The slip clay or glazing solution, being free from any salts, is not affected by the sulphuric acid, and being applied to the clay forming the body of the tank while it is in the green or unburned condition, is absorbed into the body and becomes part thereof. The cell or tank, when it has become perfectly dry, is placed in a kiln and subjected to an intense heat until the clays composing the body are vitrified. The slip-glazing by the action of the fire is incorporated in the body, having a true affinity with the body clay, but being somewhat more fusible. The outside or the glazed sides of the cell or tank flux as the proper heat is reached in the kiln, and a hard silica glaze is produced by the fluxing of the slip-clay. Upon the fluxing of the glaze the heat of the kiln is allowed to slack and gradually cool off. When sufficiently cool, the cell or tank is taken from the kiln and is in a completed state, ready to be used in forming a battery.

The body clays may be formed in the required shape by being forced through a die by machinery and the bottoms put in by hand, which would be a cheaper method.

In the accompanying drawings, which form part of this specification, similar letters of reference represent similar parts.

Figure I represents a tank or cell (marked A) in its completed state, composed of clay glazed upon the outside and inside, constructed in accordance with and after the method set forth in the foregoing description.

Fig. II is a completed battery. In the cell A are placed the plates C, which have been coated with the lead oxide, the same having been spread upon the grated plates C with a common trowel or in any other manner until the whole plate is covered and the gratings in the plates C are filled with lead oxide. As shown in the drawings, twelve of these plates or electrodes (marked C) are placed in the cell A, six with the projection or lug G to the right and six with the lug G to the left, interlapping each other, as shown in Fig. II. A detached plate is shown in Fig. III. They are then connected by the bars D D, being fitted to the lugs G, and the nuts H holding the connecting-bars in position. Fig. IV shows one of the bars D. The electrolytic liquid is then poured in the cell A until the nuts H and bars D are covered to the depth of about one inch. The cover B (shown in Fig. V) is then placed upon the cell A, the standards J J projecting through the holes E E, and the connecting-wires attached to the standards J J through the holes K K, held in place by the set-screws L L. The battery is now completed and ready to be charged with electricity. The whole is compact, light, is not easily disarranged by jarring, does not leak, and is effective in storing electricity.

These cells or boxes may be made of clay, which has not been glazed in the manner described; but the result produced is much less perfect. The cells or boxes may be glazed only on such parts thereof as are exposed to contact with the electrolytic fluid.

The cells or boxes such as I have described are less expensive than the glass cells now in use, and are capable of being used with batteries requiring much larger cells than those of glass, and are preferable in other respects.

The method of packing the plates in the cells and treating the same with the electrolytic liquid, and covering the whole and connecting the same to the battery, hereinbefore described, will be found practically very convenient; but I do not confine myself to the details of arrangement above mentioned.

There are other secondary electric batteries beside those of Faure which can be used in connection with my invention; but it is unnecessary to describe in detail how this can be done, as any one who has a practical acquaintance with secondary electric batteries and who has read the foregoing specification would be able without great difficulty to adjust the one to the other.

The cell or box above described is also intended to be used in connection with primary or generating electric batteries.

What I claim, and desire to secure by Letters Patent, is—

1. A tank or cell for containing the elements and electrolyte of secondary and other galvanic batteries, the same being of vitrified clay of the described composition—that is to say, a composition of silicate of alumina and silica in about equal proportions, with a small amount of fusible silicates mixed therewith, substantially as described.

2. A tank or cell for containing the elements and electrolyte of secondary and other galvanic batteries, the same being composed of vitrified clay of the desired composition, glazed with a vitrified slip-glaze intimately combined with and penetrating the body of said vessel, and composed of clay having in admixture a large proportion of fusible silicates, substantially as described.

In testimony whereof I have signed this specification in the presence of two subscribing witnesses.

FREDERICK W. MEEKER.

Witnesses:
R. A. PIPER,
JOHN S. MORRISON.